March 6, 1945. B. DEMPSTER 2,370,847
HEAT CONTROL APPARATUS
Filed Oct. 7, 1940 3 Sheets-Sheet 1

INVENTOR.
Burgess Dempster
BY Parkinson & Lane
ATTORNEY.

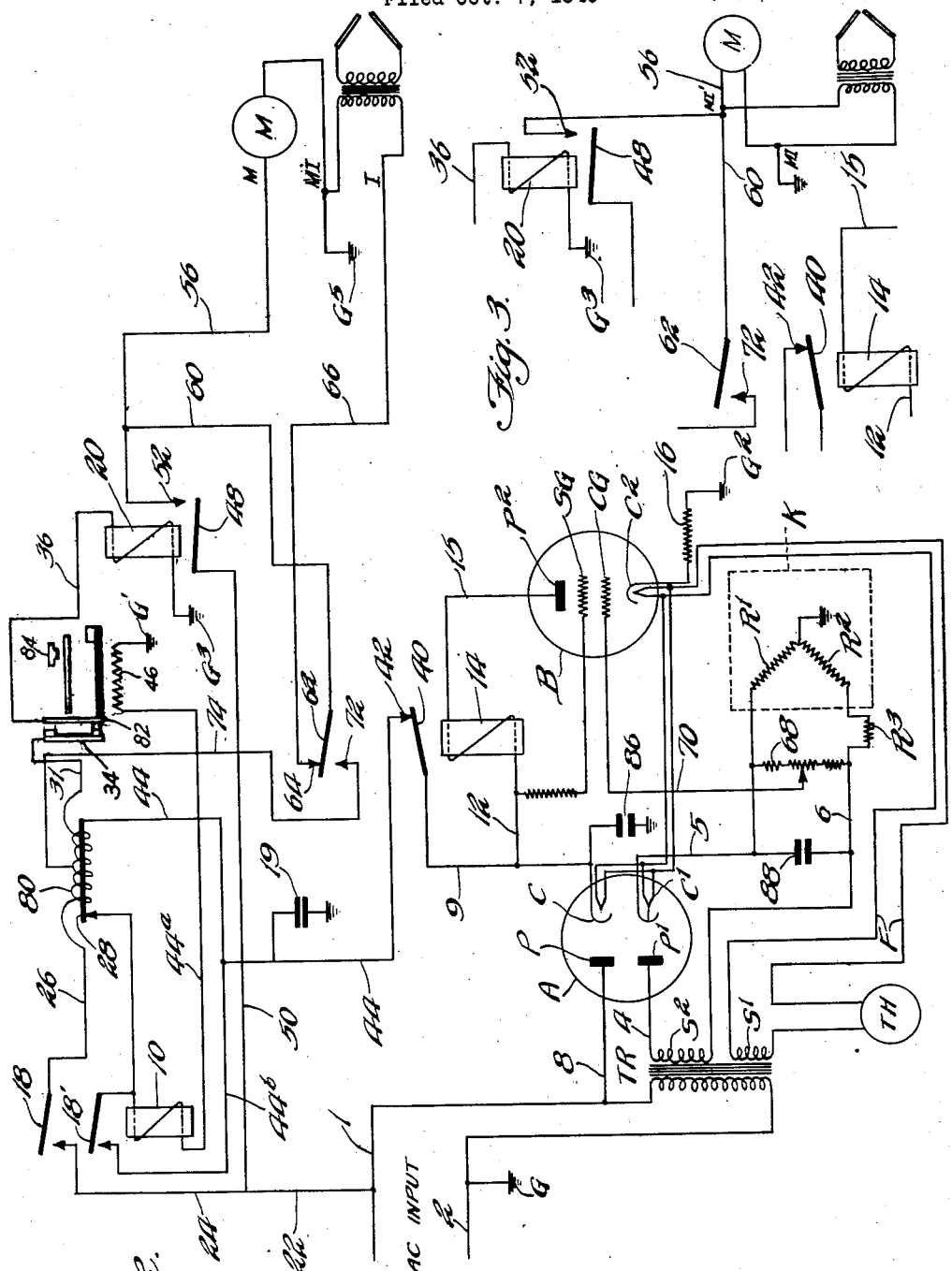

March 6, 1945.  B. DEMPSTER  2,370,847
HEAT CONTROL APPARATUS
Filed Oct. 7, 1940  3 Sheets-Sheet 3

INVENTOR.
Burgess Dempster
BY Parkinson & Lane
Attys

Patented Mar. 6, 1945

2,370,847

UNITED STATES PATENT OFFICE 2,370,847

HEAT CONTROL APPARATUS

Burgess Dempster, Bala-Cynwyd, Pa., assignor, by mesne assignments, to The Magnavox Company, Fort Wayne, Ind., a corporation of Delaware Application October 7, 1940, Serial No. 360,020

5 Claims. (Cl. 158—28)

This invention relates to control apparatus for fuel burning equipment and is more particularly, although not exclusively, intended for use with oil-burning furnaces.

Control for oil furnaces, in order to be commercially practicable, must be so arranged, constructed, operated and tied in with a thermostat in the apartment, room or other situation to which heat is to be applied, that when the thermostat is set at the desired temperature, the control will automatically turn on the fuel supply motor and ignition, turn off the burner in the event the power fails, and, in the event the oil fails, turn off the motor and ignition; also, should the temperature in the stack of the furnace drop quickly, which might happen if there is an oil stoppage, turn off the motor and ignition; and also when the temperature indicated by the thermostat has been reached must also be capable of turning off the motor and ignition.

Owing to the fact that oil burner controls now on the market are constructed and operate upon a mechanical basis they possess certain disadvantages which are inherent in such type of structure. For example, there is the ever present danger of the mechanical moving parts failing to operate due to either dirt or wear; the various contacts which are usually closed with only a slight pressure are apt to become dirty and fail to make contact; and the vibration of the thermostat is liable to momentarily close the contacts and start the burner motor.

The principal object of the present invention is to overcome or avoid the above mentioned disadvantages of present day heat control apparatus.

Another object of the invention is to provide control apparatus which will operate automatically with a minimum of care and attention and which at the same time is simple in construction enabling it to be manufactured at low cost.

Other objects of the invention will appear hereinafter as the present description proceeds.

The present invention provides the same control functions and the same safety features as do the prior constructions but this without the use of moving parts except for electrically operated relays. The control of the invention also is equally sensitive to present structures over a wide range of stack temperatures and is insensitive to vibration of the thermostat in the apartment, room or other situation the temperature of which is to be controlled.

In order that the invention may be clearly understood it will now be described with reference to the accompanying drawings, in which:

Fig. 2 is a circuit diagram of another manner in which the invention can be put into practice;

Fig. 3 is a reproduction of part of the circuit of Fig. 2 showing a modification.

Figure 1:
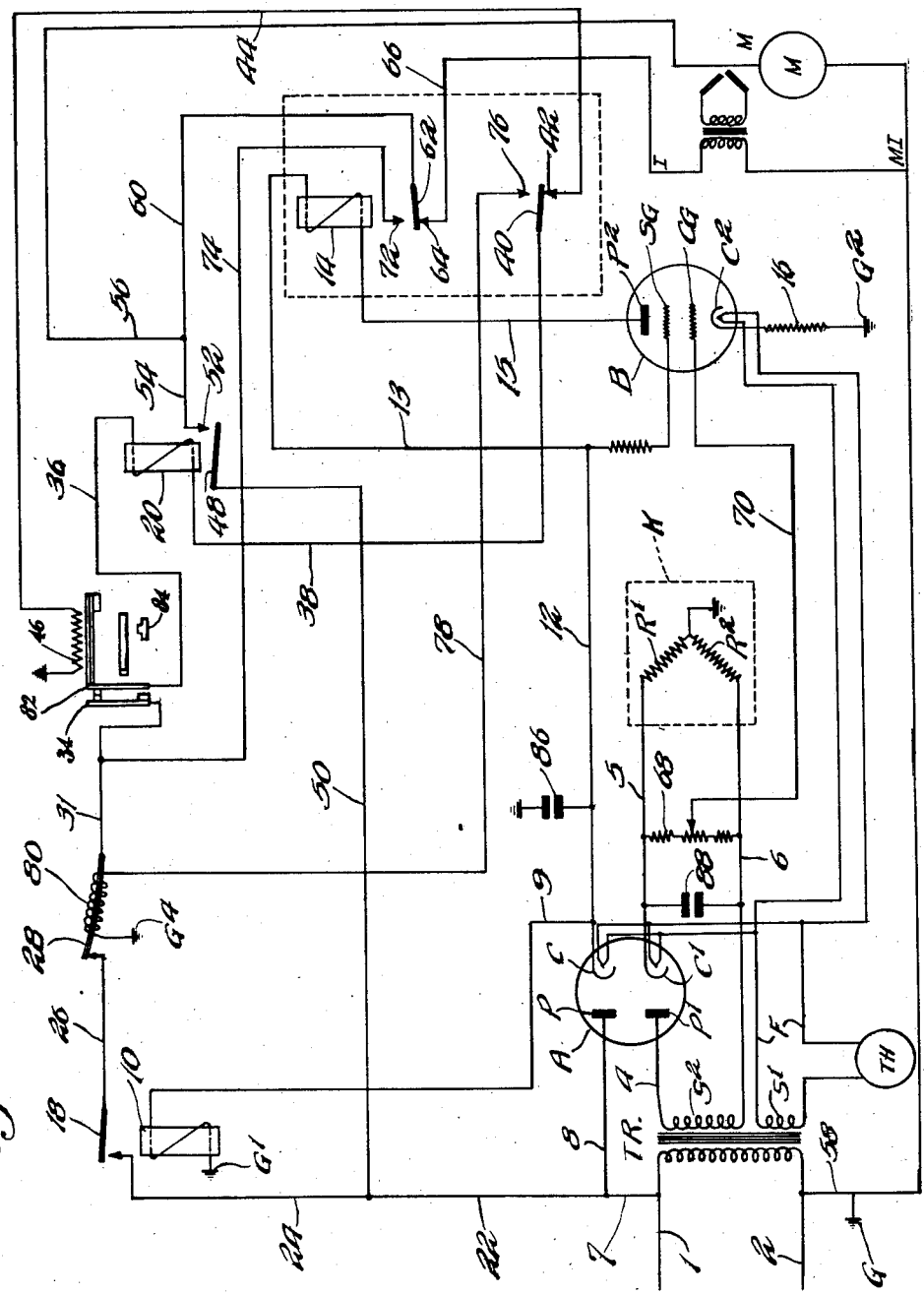
Fig. 1 is a circuit diagram of one manner in which the invention may be readily carried into effect, namely, for controlling the operation of an oil-burning furnace.

Referring to Fig. 1 of the drawings the reference numerals 1 and 2 indicate leads connected to any suitable source of electrical energy such as the usual 110 volt A. C. house supply and between which leads is connected the primary of a transformer TR. A and B are vacuum tubes, the tube A being one identified in the trade by the No. 25Z6 and which, as is well known, besides the heater filaments, includes two plates P, $P^1$ and two cathodes C, $C^1$ in the same envelope, and the tube B being one identified by the No. 25L6 and having a heater filament, a plate $P^2$, a cathode $C^2$ and control and screen grids CG and SG.

TH is a thermostat which is located in the apartment, room or other situation, the temperature of which is to be controlled. The thermostat is included in the filament circuit F of the vacuum tubes and which circuit derives its energy for heating the filaments from one secondary $S^1$ of the transformer TR, and another secondary $S^2$ of which is connected in a circuit which, for convenience, can be referred to as the "stack circuit," which includes the plate $P^1$ and $C^1$ of the tube A, the leads 4, 5 and 6 and the resistance $R^1$ and $R^2$ which are disposed within the stack K of the furnace and the construction, operation and purpose of which will be hereinafter described.

The thermostat TH is, of course, set to operate at any predetermined temperature at which the furnace is to be turned on to supply heat to the room or other situation wherein the thermostat is located. When the thermostat so operates it will close the filament circuit F and heat the filaments in the vacuum tubes A and B and when the cathodes reach emitting temperature current will flow through the tube A by way of lead 1 on one side of the power input, leads 7 and 8, plate P, cathode C, lead 9 and to and through relay 10 to ground at $G^1$, the other side of the power line being grounded at G. The circuit which includes the plate $P^1$ and cathode $C^1$ of tube A will likewise be closed at this time. Under similar conditions, tube B will be placed in condition to operate from one side of the power line through leads 7 and 8, plate P and cathode C of tube A, leads 12 and 13, relay 14, the operation of which is under the control of tube B, lead 15, and tube B to ground at $G^2$. Tube B does not operate at this time, however, because it is negatively biased by means of a resistance 16 disposed in the lead to its cathode $C^2$.

The operation of vacuum tube A, it will be seen, energizes the electro-magnet 10 which closes the magnetic relay 18 to complete a circuit for a relay 20 from one side of the power line through leads 7, 22 and 24, voltage switch 18, lead 26, second voltage switch 28, leads 31 and 32, reset switch 34, lead 36, relay 20, lead 38, armature 40 of relay 14, contact 42, lead 44, and resistance 46 for reset switch 34, to ground at $G^3$.

The energization of relay 20 raises its armature 48 to close a circuit for the oil supply motor, this circuit being from one side of the power line through leads 7, 22 and 50, armature 48 of relay 20, contact 52, leads 54 and 56 and one terminal M of the motor and thence back to the other side of the line by way of the common motor and ignition terminal MI and lead 58.

The energization of the electro-magnet 20 simultaneously closes a circuit for turning on the ignition means, this circuit being the same as that for the motor up to and including the lead 54 and then continuing through the lead 60 to a second armature 62 of the relay 14, contact 64, lead 66, ignition terminal I and thence back to the other side of the power line by way of the common motor and ignition terminal MI and lead 58.

As soon as combustion takes place in the furnace, the temperature in the stack K naturally rises and this rise has an influence upon the resistances $R^1$ and $R^2$, which vary in resistance at different rates with change of temperature, resistance $R^1$ heating up quickly and resistance $R^2$ being thermally insulated and heating up more slowly than the resistance $R^1$ which is not provided with thermal insulation.

The circuit in which said resistances $R^1$ and $R^2$ are disposed is bridged between the leads 5 and 6 thereof by a resistance 68 to the midpoint of which is connected one end of a lead 70, the other end of which is connected to the control grid CG of the tube B. When the resistances $R^1$ and $R^2$ are at equal or substantially equal temperatures, the tube B, owing to the presence of the resistance 16 in the cathode lead thereof, will have a negative grid bias and hence will conduct but little if any current, at least not enough to operate the relay 14. However, as the temperature in the stack increases, the values of the resistances $R^1$ and $R^2$ will change or be thrown out of balance and a positive charge will then be set up and flow through the lead 70 and be impressed upon the control grid of tube B with the result that the negative bias on the tube will be counteracted and the tube B will become operative through the circuit hereinbefore traced.

The resistances $R^1$ and $R^2$ (see Fig. 4) are preferably made with an iron-nickel alloy which increases in electrical resistance with temperature. The wire is wound on a glass string S and covered with a woven tube of glass cloth T, which, in turn, is wound on a metal frame.

Figure 4:
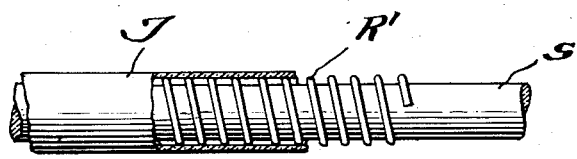
Fig. 4 is a side view of a resistance device for use in the apparatus of this invention.
Figure 5:
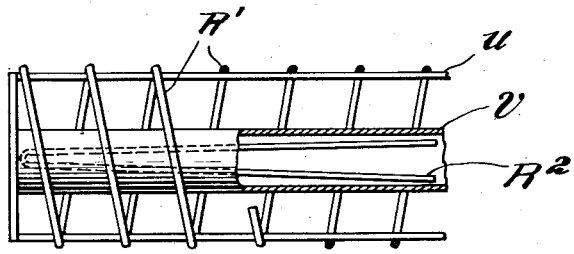
Fig. 5 is a side view of a resistance arrangement employed in the apparatus of the invention.

This preferred construction is cheap and durable and permits resistance $R^1$ to heat up very quickly as there is little associated mass to heat. Resistance $R^2$ can be thermally insulated by conducting the heat through metal. The mass of this metal (which must be heated concurrently with the wire resistance) is so gauged as to delay the heating of resistance $R^2$ as compared to the heating of resistance $R^1$. This can be carried into effect, as shown in Fig. 5, by winding the resistance $R^1$, constructed as shown in Fig. 4, spirally about a framework U of metal rods and placing the resistance $R^2$ within a metal tube V disposed within said framework.

The operation of the tube B energizes the relay 14, the circuit being from one side of the power line through leads 7 and 8, plate P and cathode C of tube A, leads 12 and 13, relay 14, lead 15, tube B, and resistance 16 to ground at $G^2$.

The energization of relay 14 pulls up its armature 62 to open the ignition circuit at contact 64 and shut off the ignition.

The energization of relay 14 also pulls up its other armature 40 to break the circuit for the relay 20 at contact 42 but an alternative circuit is immediately closed to maintain the said relay operative, this circuit being from one side of the power line through leads 7, 22 and 50, armature 48, contact 52, leads 54 and 60, armature 62, contact 72, leads 74 and 32, reset switch 34, lead 36, relay 20, lead 38, armature 40, contact 76, lead 78, and resistance 80 to ground at $G^4$. It is to be noted that the energization of the relay 14 and the consequent movement of its armature away from contact 42 also is instrumental in removing the power from the resistance 46 of the reset switch 34.

Reset switch 34 is a thermally operated bimetallic switch with a mechanical latch 82. If current flows through its resistance 46 for more than a predetermined period, say, for more than a minute, the reset switch will open and interrupt the circuit to the relay 20, the armature 48 of which will, in turn, release and open the motor and ignition circuits respectively, thus shutting down the furnace. Hence the switch 34 acts as a safety device in the case where the ignition, after being turned on for a predetermined period, such as a minute as above stated, fails to ignite the fuel. The switch 34 is provided with a manually operable push button 84 so that it cannot return to its closed position until the button has been depressed and released to disengage the latch 82.

Voltage switch 28 is a thermally operated single pole switch and within a few seconds after current flows through its resistance 80 on the operation of relay 14 as above described, the switch will open; hence the alternative circuit for the relay 20 just above described.

The reason for including the voltage switch in the hook-up is to insure complete closing down of the furnace for a predetermined period in case of a temporary power failure. The switch is designed so as to normally require a period of from one to three minutes after operation before it will return to its normal closed position and this period is chosen as it is calculated to provide ample time within which the furnace will be purged of dangerous oil vapor. Thus when power is again available, relay 20 cannot be re-operated to restart the motor and again turn on the ignition until said predetermined period has elapsed.

Means is provided in the form of electrolytic condensers 86 and 88 for smoothing out the pulsating D. C. produced by the tube A so that the relay 14 will operate without chattering.

As has been hereinbefore explained, when the temperature in the stack K has risen to a point where conditions are such that the tube B operates, relay 14 is energized and remains so during the time the furnace continues to heat up. After the furnace has been operating for sometime, however, the resistance $R^2$ will "catch-up" as it were, with the resistance $R^1$ and they will then be of substantially equal temperatures. Nevertheless, in spite of the diminished positive charge on the control grid of tube B due to the said substantial equalization of the temperatures of the resistances, the relay 14 will remain energized as the relatively small current then flowing through the tube B will maintain the circuit for said relay closed.

In the event of flame failure at any time whilst the furnace is in operation, it will be appreciated from what has already been said that resistance $R^1$ will cool off more quickly than will resistance $R^2$, with the result that the positive charge on the control grid of tube B will be changed to negative and such tube will cease to operate and the electro-magnet 14 will de-energize and this in turn will break the then existing circuit for electro-magnet 20 at both contacts 72 and 76 with the result that armature 48 will open breaking both the motor and ignition circuits, the furnace will shut down and cannot be restarted until the voltage switch 28, which it will be remembered is open while the electro-magnet 14 is operative, cools off and recloses.

As will now be clear the thermostat TH being disposed in the circuit of the filaments of the tubes A and B controls the opening and closing of that circuit but it will be understood that after said circuit is closed there will be a slight delay, say of from 10 to 30 seconds, before the burner comes into operation. Further, it will be seen that the burner will also continue to operate for a brief period after the thermostat opens the filament circuit, that is to say, until the cathodes have cooled below their emitting temperature. This delay has the advantage, however, of preventing the intermittent operation of the burner by irregular closing of the thermostat contacts due to vibration or other causes. It also ensures that the burner will not be turned off should the thermostat contacts momentarily open.

Referring now to Fig. 2 of the drawings, the arrangement therein illustrated is fundamentally the same as that of the circuit of Fig. 1, differing therefrom mainly in but two respects, namely, in that arrangements are made whereby the burner will shut down on a power failure occurring any time after the ignition is shut off, in contradistinction to the arrangement of the previous figure in which the burner is shut down, in the event of a power failure, only after a short time had elapsed after the ignition is turned off. The second point of difference is that in the arrangement now to be described the "stack" or bridge circuit has been modified by the inclusion of an additional resistance so as to increase the sensitivity of the vacuum tube controlled thereby and insure the shutting down of the burner even if the flame should fail just after the ignition period.

In describing the circuit of Fig. 2 the same reference letters and numerals will be used as far as possible to identify parts corresponding to those employed in the Fig. 1 arrangement.

As before, when the room thermostat calls for heat, the tube filaments are heated which causes the rectifier tube A, which is again a 25Z6 tube, to conduct and a D. C. voltage appears across condenser 86. Current then flows by way of leads 8 and 9 through the normally closed contact 42 of relay 14, and the lead 44 to the normally closed voltage switch 28, through the energizing coil of relay 10 and lead 44ª, and the heating resistor 46 of the reset switch 34 to ground at $G^1$, the other side of the main power supply being grounded at G as before.

Relay 10 is accordingly energized to attract its armatures 18 and 18'. Current then can also flow from line 1 through leads 22 and 24, armature 18, lead 26, voltage switch heater resistor 80, reset switch 34, lead 36, to and through relay 20 to ground at $G^3$. The relay 20 attracts its armature 48 to close a circuit for the fuel supply motor from line 1, leads 22 and 50, armature 48, contact 52, lead 56 to one motor terminal M and thence through the motor to the common motor and ignition terminal MI and finally to ground at $G^5$. Current also flows through the same circuit up to and including the contact 52 and thence through lead 60, armature 62 of relay 14, contact 64 and lead 66 to terminal I to operate the ignition transformer of the burner and thence through the common terminal MI to ground at $G^5$.

With the burner and the ignition both turned on the temperature in the furnace stack will rise and change the resistance of $R^1$ and $R^2$ to reduce the negative voltage on the grid of tube B and cause it to conduct current, as hereinbefore explained in connection with Fig. 1. Current now flows through the plate circuit of tube B and through the energizing coil of relay 14 causing the armatures 40 and 62 to disengage contacts 42 and 64 respectively and the latter armature to engage contact 72.

The opening of the ignition circuit at contact 64 turns off the ignition, and the closing of contact 72 provides an alternative circuit whereby power can still be obtained for continuing the energization of relay 20, this circuit being from lead 50, through armature 48, contact 52, lead 60, armature 62, contact 72, lead 74, part of voltage switch resistor 80, lead 31, reset switch 34, lead 36, and coil of relay 20 to ground at $G^3$.

During the time the stack temperature was increasing, current has been flowing through the heater resistor 80 of voltage switch 28. This causes the switch 28 to opening. Current to keep relay 10 closed, therefore, then flows through leads 44 and 44ᵇ, armature 18', coil of relay 10, heating resistor 46 to ground at $G^1$. When the ignition is turned off as above the opening of the circuit at contact 42 de-energizes relay 10 and armatures 18 and 18' move to open position. If the main power supply should fail even for a fraction of a second, relay 10 would de-energize and could not be re-energized again until voltage switch 28 had cooled off and reclosed. The time required for voltage switch 28 to cool off and reclose is the same as that of the equivalent switch in the Fig. 1 arrangement.

Referring now to the second modification embodied in the Fig. 2 circuit, it will be seen that in series with the resistance $R^2$, namely, the slow heating resistance of the stack or bridge circuit, there is arranged a third resistance $R^3$, which, however, does not vary in value with change of temperature as do the resistances $R^1$ and $R^2$.

As the values of $R^1$ and $R^2$ are equal in resistance when they are both cold, this extra resistance in series with $R^2$ puts a negative bias on the grid CG of tube B. The self-biasing resistor 16 can therefore be decreased in value. Any change in voltage on grid CG will change the plate current flowing through the relay 14, tube B and resistor 16. Because resistor 16 has been decreased, the change in plate current for a given change in grid voltage will be greater for this arrangement than when resistor 16 produced all of the necessary initial negative grid bias.

The values $R^1$, $R^2$ and $R^3$ and the cathode resistance 16 in the cathode circuit of tube B are so chosen that the tube B will not conduct sufficient plate current to energize relay 14 while resistances $R^1$ and $R^2$ are cold, and hence the ignition can then be turned on. When the temperature in the stack increases, $R^1$ increases in resistance faster than $R^2$, which reduces the negative voltage on the grid CG of tube B and permits the tube to conduct to energize relay 14 and open the ignition circuit. After the furnace has been in operation for some time, $R^1$ and $R^2$ will reach a substantially equal temperature, but because fixed resistor $R^3$ is in series with $R^2$, the total resistance in the two legs of the bridge circuit can never become equal and tube B will pass sufficient current to maintain relay 14 energized and the ignition circuit open. Relay 14 will only be de-energized if there is a drop in stack temperature, or if the two resistors $R^1$ and $R^2$ are finally cooled to approximately room temperature. To illustrate this, assume, for example, that the stack resistances are 5000 ohms each and the fixed resistance in series with the slow heating stack resistor is 1500 ohms. The resistances when cool and when hot will then be:

|  | Total resistance in fast heating side of bridge circuit | Total resistance in slow heating side of bridge circuit |
|---|---|---|
|  | Ohms |  |
| Cold | 5,000 | 5,000+1,500=6,500 ohms (30% more than other leg). |
| Hot (about 320° F.) | 7,500 | 7,000+1,500=8,500 ohms (13% more than other leg). |

The furnace would therefore definitely shut down even if there was a flame failure as soon as the ignition was turned off. Also the ignition would not come back on even if the burner had been operating for a long period of time which would make the fast and slow heating resistors approximately equal temperatures.

Reset switch 34 need not be re-described because it is constructed, operates and serves the same purpose as the equivalent switch in Fig. 1.

It will be observed that the heating resistor 80 for the voltage switch 28 is tapped. During the time the ignition is on and the power for the coil of relay 20 is being received through the armature 18, the current flows through the entire resistor 80. This produces considerable heat and opens switch 28 quickly. As soon as the ignition is turned off and power for the coil of relay 20 is received through contact 72, the current only flows through a portion of resistor 80 and furnishes sufficient heat to hold the switch 28 open but is not sufficient to damage the bimetal operating strip.

Electrolytic condenser 19 holds relay 10 closed during the time relay 14 is shifting the contacts, thus preventing the de-energization of relay 20 before the alternative circuit including lead 74 is closed and consequently avoiding the shutting down of the burner. Relay 10 is held closed during the time contact 42 is open and before contact 72 is made. Instead of using electrolytic condenser 19, a relay with an extra contact spring can be arranged to make contact 72 before contact 42 is broken.

In some instances it may be preferred to employ an arrangement in which the ignition means is turned on as long as the fuel supply motor continues to operate. This can be readily accomplished by making but few changes in the circuit arrangement of Fig. 2, namely, as will be seen from Fig. 3, the contact 64 and lead 66 to the combined motor and ignition terminal MI of Fig. 2 are dispensed with and there is substituted a second combined motor and ignition terminal MI' for the motor terminal M. Then when the relay 20 is energized to bring its armature 48 into engagement with contact 52 a circuit will be closed to simultaneously start the motor and turn on the ignition, this circuit including the lead 50, armature 48, contact 52, lead 56 to the combined motor and ignition terminal MI', through the motor and ignition means to the other motor and ignition terminal MI and thence to ground at $G^5$.

Upon energization of relay 14 by the passage of current through tube B, armature 62 will engage contact 72 as before but the ignition will not be affected as in the circuit of Fig. 2 and will remain on as long as the motor is permitted to run.

The whole of the apparatus of the present invention, with the exception, of course, of the resistances $R^1$ and $R^2$ which are located in the furnace stack, can be conveniently mounted in any suitable casing which may be placed in any convenient position, connection between the two sections or parts being made through the leads 5 and 6 and the ground lead connected to the common junction of $R^1$ and $R^2$.

In conclusion, it is to be appreciated that the invention has been described in connection with an oil-burning furnace, but, nevertheless, it is to be understood that the invention is equally applicable to other equipment where similar conditions are involved. In addition, it is to be understood that the invention is not to be limited to the precise details of the circuit described and shown; for example, the operations to be performed may be divided up among a different number of tubes than those shown and such, for example, as three tubes.

I claim:

1. The combination with an oil burning furnace having a stack, a fuel supply motor and fuel ignition means, of control apparatus comprising a first vacuum tube, a second vacuum tube, circuit means including a thermostat for rendering said first vacuum tube operative and for placing said second vacuum tube in condition to operate, means for deferring the initial operation of said second vacuum tube, circuit means including a relay controlled by said first vacuum tube only for energizing said motor and turning on said ignition means upon operation of said first vacuum tube, a pair of resistances in the stack of the furnace, each responsive at a different rate to variations in temperature connected to said second vacuum tube for rendering said tube operative when the temperature differential between said pair of resistances reaches a predetermined figure, and a circuit including said second vacuum tube and a second relay under the control of said second vacuum tube for maintaining said first mentioned relay energized to continue operation of said motor when said second tube is so rendered operative, said last mentioned circuit including means whereby a small current can pass through said second vacuum tube to maintain said second relay operative during the normal operation of the furnace after the ignition has been turned off and the temperatures of said resistances have again become equalized.

2. The combination with an oil burning furnace having a stack, a fuel supply motor and fuel ignition means, of control apparatus comprising a first vacuum tube, a second vacuum tube, circuit means including a thermostat for rendering said first vacuum tube operative and for placing said second vacuum tube in condition for operation subsequent to said first tube, a pair of relays, circuit means including the first of said relays for closing a circuit including the second relay, both of said relays being controlled by said first vacuum tube only and the energization of said second relay starting said motor and turning on said ignition means, circuit means including elements in the stack of the furnace responsive to different temperatures and connected to said second vacuum tube for bringing about the operation of said tube when a temperature differential between said temperature responsive elements reaches a predetermined figure, a third relay, and a circuit including said second vacuum tube and the third relay under the control of said second vacuum tube for turning off said ignition means when said temperature differential has been reached and said last mentioned tube rendered operative, said last mentioned circuit including means whereby a small current can continue to pass through said second vacuum tube to maintain said third relay operative during normal operation of the burner when the temperatures of said temperature responsive elements have again become equalized.

3. The combination with an oil burning furnace having a stack, a fuel supply motor and fuel ignition means, of control apparatus comprising a first vacuum tube, a second vacuum tube, circuit means including a thermostat for rendering said first vacuum tube operative and for placing said second vacuum tube in condition for operation subsequent to said first tube, a pair of relays, circuit means including the first of said relays for closing a circuit including the second relay, both of said relays being controlled by said first vacuum tube only and the energization of said second relay starting said motor and turning on said ignition means, circuit means including temperature responsive elements in the stack of the furnace and connected to said second vacuum tube for bringing about the said initial operation of said tube when a temperature differential between said elements reaches a predetermined figure, a third relay and a circuit including said second vacuum tube and the third relay under the control of said second vacuum tube for turning off said ignition means and for energizing an alternative circuit to maintain said fuel supply motor operative when said temperature differential has been reached and said last mentioned tube rendered operative, said last mentioned circuit including means whereby a small current can continue to pass through said second vacuum tube to maintain said third relay operative during normal operation of the burner when the temperatures of said temperature responsive elements have again become equalized.

4. The combination with an oil burning furnace having a stack, a fuel supply motor and fuel ignition means, of control apparatus comprising a first vacuum tube, a second vacuum tube, circuit means including a thermostat for rendering said first vacuum tube operative and for placing said second vacuum tube in condition for operation subsequent to said first tube, a pair of relays, circuit means including the first of said relays for closing a circuit including the second relay, both of said relays being controlled by said first vacuum tube only, and the energization of said second relay starting said motor and turning on said ignition means, a pair of resistances in the stack of the furnace each responsive at a different rate to variations in temperature connected to said second vacuum tube for bringing about the said initial operation of said tube when the temperature differential between said elements reaches a predetermined figure, a third relay, and a circuit including said second vacuum tube and the third relay under the control of said second vacuum tube for turning off said ignition means when said temperature differential has been reached and said last mentioned tube rendered operative, said last mentioned circuit including means whereby a small current can continue to pass through said second vacuum tube to maintain said third relay operative during normal operation of the burner when the temperatures of said resistances have again become equalized.

5. Apparatus for controlling the operation of fuel burning equipment having a fuel supply motor and a fuel ignition means comprising a source of electrical energy, a transformer having a primary connected to said energy source and a plurality of secondaries, a rectifier and a vacuum tube, a filament circuit for said rectifier and vacuum tube connected to one of said transformer secondaries, a thermostat included in said circuit, a stack circuit connected to another of said secondaries, said stack circuit including a plate and cathode of said rectifier, a pair of temperature responsive elements which vary in resistance at different rates with change of temperature, and a resistance bridging said temperature responsive elements and the midpoint of which is connected to the control grid of said vacuum tube, a first circuit including another plate and cathode in said rectifier and a relay, said circuit leading from one side of said power input through said rectifier and relay and thence through ground back to the other side of said power input, a plate circuit for said vacuum tube which includes the second mentioned plate and cathode of said rectifier, a second relay, the cathode of said vacuum tube and a resistance, the operation of said vacuum tube being delayed in relation to said rectifier by reason of the inclusion of said last mentioned resistance by which it is negatively biased, a second circuit under the control of said first relay, said second circuit including a reset switch and a third relay and leading from one side of the power input through said reset switch, said third relay, an armature of said second relay, a resistance for said reset switch to ground and thence back to the other grounded side of the power input, a third circuit closed by the energization of said third relay for actuating the fuel supply motor, said third circuit leading from one side of the power line through the armature of said third relay to the motor and thence back to the other side of the power input, a fourth circuit including an ignition transformer, said fourth circuit also being closed by the energization of said third relay for turning on the fuel ignition means, said fourth circuit leading from one side of the power supply through the armature of said third relay, a second armature of said second relay and thence through the primary of said ignition transformer back to the other side of the power supply, the arrangement being such that on the raising of the temperature in the furnace stack the differential variation in resistance of the temperature responsive elements will cause a positive charge to be supplied to the control grid of said vacuum tube to counteract the negative bias thereon and permit said tube to operate, such operation energizing said second relay to open the said fourth circuit at the second armature of said second relay to turn off the ignition means, the second circuit being simultaneously opened to de-energize said third relay by the raising of the first armature of the second relay, an alternative circuit closed by the raising of the first armature to maintain said third relay energized to the exclusion, however, of the resistance of said reset switch, said last mentioned circuit including means whereby a small current can continue to pass through said vacuum tube to maintain said second relay operative during normal operation of the furnace when the temperatures of said responsive elements have again become equalized after the ignition has been turned off by the opening of said fourth circuit.

BURGESS DEMPSTER.